Figure 1:
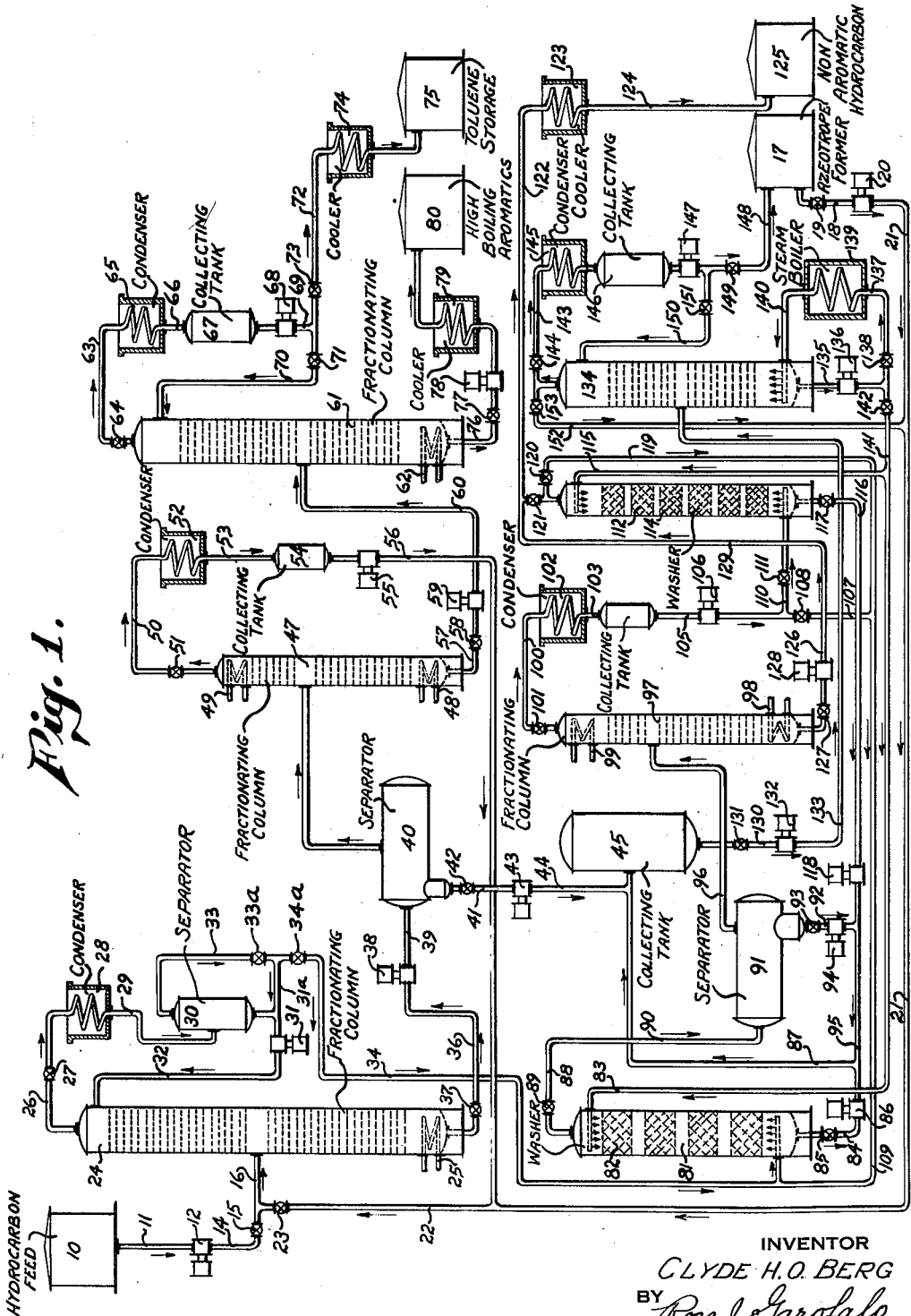

Oct. 7, 1947.   C. H. O. BERG   2,428,611
RECOVERY OF AZEOTROPE FORMER IN AZEOTROPIC
DISTILLATION OF HYDROCARBONS
Filed Nov. 17, 1941   2 Sheets-Sheet 1

INVENTOR
CLYDE H. O. BERG
BY Ross J. Garofalo
ATTORNEY

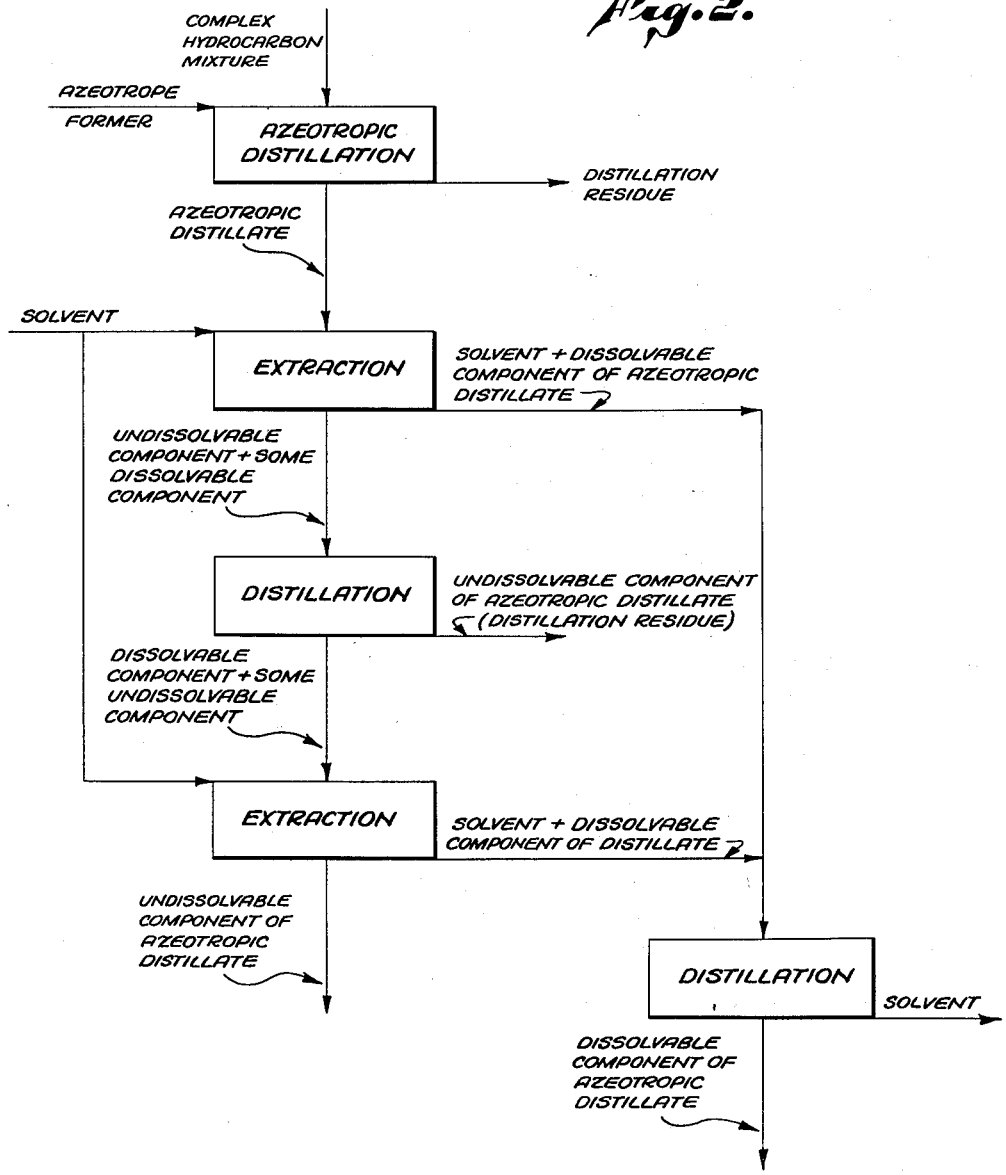

Patented Oct. 7, 1947

2,428,611

UNITED STATES PATENT OFFICE 2,428,611

RECOVERY OF AZEOTROPE FORMER IN AZEOTROPIC DISTILLATION OF HYDROCARBONS

Clyde H. O. Berg, Long Beach, Calif., assignor to Union Oil Company of California, Los Angeles, Calif., a corporation of California Application November 17, 1941, Serial No. 419,394

10 Claims. (Cl. 202—42)

This invention relates to a process of azeotropic distillation to prepare pure hydrocarbons from complex petroleum fractions which are difficult to separate by ordinary fractional distillation due to the small differences in boiling points of the hydrocarbons contained in the petroleum fraction. The invention is particularly directed to an improved process for separating the hydrocarbons and the azeotrope former that are contained in the azeotropic distillate produced by the azeotropic distillation.

The process of separating one hydrocarbon component from another hydrocarbon component of substantially the same boiling point contained in a complex hydrocarbon fraction by azeotropic distillation is well known. This process consists in distilling the hydrocarbon fraction in the presence of an extraneous substance which has a preferential affinity for one of the components contained in the complex hydrocarbon fraction, thus causing a disturbance of the vapor pressure equilibrium that formerly existed in the fraction in such manner that the partial vapor pressure or fugacity of at least one component in the fraction is changed sufficiently to permit its separation by controlled fractional distillation. In such processes, the distillation effects the separation of the relatively more paraffinic hydrocarbons together with the extraneous substance leaving as undistilled bottoms the relatively less paraffinic hydrocarbons which may or may not contain a portion of the extraneous substance. In the present description of my invention the aforesaid type of fractional distillation will be referred to as azeotropic distillation, the extraneous substance or substances which are added to the complex hydrocarbon fraction to effect the aforementioned change will be referred to as azeotrope formers and the overhead from the azeotropic distillation will be referred to as the azeotropic distillate.

One of the main difficulties in the azeotropic distillation process is in the separation or recovery of the azeotrope former from the hydrocarbons contained in the azeotropic distillate. One of the methods proposed for this purpose resides in washing the azeotropic distillate with water which is adapted to dissolve the azeotrope former from the azeotropic distillate and thus be separated from the hydrocarbons by settling and stratification. The solution of azeotrope former and water may be distilled to separate the azeotrope former from the water.

However, difficulty has been experienced to separate the azeotrope former substantially completely from the azeotropic distillate by washing with water since in many cases, the azeotrope former has a preferential solubility in the hydrocarbons as compared with the solubility in the water. The result is that the hydrocarbons must be washed with an excessively large amount of water in order to remove the last traces of the azeotrope former so that the hydrocarbons may be utilized and the azeotrope former recovered without sustaining a substantial loss of this more valuable material. To illustrate, it has been found that methyl ethyl ketone containing water, i. e. about 10% by volume, is very efficient as an azeotrope former to effect the separation of non-aromatic hydrocarbons from a hydrocarbon fraction containing toluene. Yet the use of this azeotrope former offers the serious difficulty of recovering the methyl ethyl ketone from the azeotropic distillate. While the separation of the methyl ethyl ketone may be accomplished by washing with water, this has required about five or six volumes of water for each volume of azeotropic distillate. Even by washing the azeotropic distillate with this large amount of water, the hydrocarbons thus separated still contain a substantial amount of the methyl ethyl ketone so that this amount of methyl ethyl ketone is lost and the azeotropic distillation system must necessarily be replaced with a further quantity of the methyl ethyl ketone.

It is an object of my invention to effect the separation of the azeotrope former from the azeotropic distillate in an efficient and economical manner without entailing loss of azeotrope former.

Briefly stated, I have discovered that a substantially complete separation of the azeotrope former from the hydrocarbons contained in the azeotropic distillate may be accomplished by a combination of steps involving a primary washing with water of the azeotropic distillate to remove as much of the azeotrope former as is economically possible, then distilling the washed hydrocarbons containing the remaining azeotrope former under such conditions as to distill all of the remaining azeotrope former together with a relatively small portion of the hydrocarbons while leaving the major portion of the hydrocarbons as a distillation bottoms substantially free from azeotrope former and then subjecting the small amount of distilled mixture of azeotrope former and hydrocarbons to a second washing with water to remove a further amount of the azeotrope former. In some cases, the second washing operation may be carried out in a separate washing stage in which case the aqueous solution of azeotrope former is added to the aqueous solution obtained in the first washing stage while the washed hydrocarbons may be passed to storage if free from azeotrope former or recycled to the first washing stage or to the aforementioned distillation stage if still containing an appreciable quantity of the azeotrope former. Also, instead of washing the distilled mixture of azeotrope former and hydrocarbons in a second stage, this small amount of the mixture may be recycled to the first washing stage where it is washed together with the azeotropic distillate.

In this manner, I am able to recover at one end of the azeotrope former recovery system, an aqueous solution of the major portion of the azeotrope former relatively free from hydrocarbons and at the other end of the system, the major portion of the hydrocarbon fraction relatively free from azeotrope former. The aqueous solution of the azeotrope former may be subjected to fractional distillation to recover the azeotrope former either as a material relatively free from water or as a mixture containing the optimum amount of water for azeotropic distillation, leaving water as a distillation bottoms free from azeotrope former. The hydrocarbon fraction may be passed to storage without further treatment.

Other objects, features and advantages of my invention will be apparent to those skilled in the art from the drawings in which Fig. 1 represents a diagrammatic arrangement of apparatus for carrying out my invention and Fig. 2 is a simplified flow diagram of the process of the invention. In the following example, the invention will be described as applied to the separation of toluene from a hydrocarbon fraction employing methyl ethyl ketone containing about 10% by volume of water as azeotrope former. However, it will be observed that this example is not to be taken as limiting my invention since the process is applicable to separate other components from complex substances employing other azeotrope formers under conditions adapted to effect the desired separation.

In Fig. 1, the hydrocarbon feed to be resolved into its component parts, such as for example, a hydrocarbon fraction obtained by fractionation of a catalytically reformed gasoline, said fraction having a boiling range of about 200 to 240° F. and consisting of substantially 45% by volume of toluene, 6% by volume of olefins and the remainder paraffins and naphthenes, is taken from tank 10 via line 11 and is pumped by pump 12 through line 14 controlled by valve 15 into line 16. Azeotrope former, such as methyl ethyl ketone containing about 10% water, is taken from tank 17 via line 18 controlled by valve 19 and is pumped by pump 20 through lines 21 and 22 and valve 23 into line 16 where it is mixed with the hydrocarbon feed from tank 10. The mixture of hydrocarbon feed and azeotrope former in the ratio of approximately two parts of the azeotrope former and one part of hydrocarbon feed in the example herein given, is passed into fractionating column 24 where the mixture is subjected to fractionation, heat being supplied by closed steam coil 25. If desired, the azeotrope former may be introduced directly into the fractionating column at any other point as near the bottom of the column in which case it will serve to increase the efficiency of separation of the non-aromatic hydrocarbons near the bottom of the column. In the fractionating column the distillation is controlled so as to distill overhead an azeotrope consisting of the paraffin, olefin and naphthene hydrocarbons together with substantially all of the methyl ethyl ketone and water. In the example herein given, this is accomplished at an overhead temperature of approximately 160–170° F. and at atmospheric pressure. If desired, the azeotropic distillation may be carried out either at atmospheric or superatmospheric pressure or under a vacuum. The above overhead mixture is removed from the fractionating column via line 26, controlled by valve 27, condensed in condenser 28 and passed via line 29 into a separator 30 where the azeotropic distillate separates into two layers, i. e. an upper layer consisting of the bulk of the non-aromatic hydrocarbons together with the bulk of the methyl ethyl ketone and a lower layer consisting of the bulk of the water together with a small amount of methyl ethyl ketone. The lower layer is withdrawn from the bottom of the separator 30 by pump 31 and is passed via line 32 to fractionating column 24 to serve as reflux for the fractionation. The upper layer of the azeotropic distillate is passed via line 33 controlled by valve 33a and line 34 controlled by valve 34a to the methyl ethyl ketone-water recovery system as will be described hereinafter. A portion of the upper layer may be passed via line 31a into line 32 to serve as additional reflux if the amount of the lower layer is insufficient to effect the desired refluxing in column 24.

The bottoms in the fractionating column 24 consisting of the aromatic fraction or toluene are withdrawn via line 36 controlled by valve 37 and are pumped by pump 38 through line 39 into separator 40 where any methyl ethyl ketone and water settles from the hydrocarbons and is withdrawn via line 41 controlled by valve 42 and is passed by pump 43 through line 44 into methyl ethyl ketone-water collecting tank 45.

In the event the bottoms fraction from the fractionating column 24 contains a portion of the azeotrope former, this is removed by passing the fraction via line 46 into fractionating column 47 provided with a heater 48 and reflux cooling coil 49 where the azeotrope former may be fractionated and removed via line 50 controlled by valve 51, condensed in condenser 52 and passed via line 53 into collecting tank 54 from which it may be returned to the fractionating column 24 by pump 55 and lines 56, 22 and 16. The bottoms from the fractionating column 47 are passed via line 57 controlled by valve 58 and pump 59 into fractionating column 61 where the mixture is fractionated to remove the toluene as an overhead product aided by heat from the heater 62. The vaporized toluene is removed from the top of the fractionating column 61 via line 63 controlled by valve 64, condensed in condenser 65 and passed via line 66 into collecting tank 67. The condensate may be withdrawn from collecting tank by pump 68 and passed into line 69. Part of the condensate may be recycled via line 70 controlled by valve 71 to the fractionating column 61 to serve as reflux for the fractionation. The remaining portion is passed via line 72 controlled by valve 73 through cooler 74 into storage tank 75. The bottoms from the fractionating column 61 consisting of a small amount of xylene or a mixture of xylene and higher boiling aromatic hydrocarbons, are withdrawn via line 76 controlled by valve 77 and pumped by pump 78 through cooler 79 into storage tank 80. In the event the feed stock is carefully fractionated as to remove all aromatic hydrocarbons other than toluene, the bottoms in fractionating column 24 will be free from such aromatic hydrocarbons as xylene in which case the fractionation step to remove such higher boiling aromatic hydrocarbons is omitted.

The toluene obtained in tank 75 and the higher boiling aromatic hydrocarbons obtained in tank 80 may be treated with clay which may be accomplished at a temperature of about 230° F. employing 1 to 5 pounds of clay per barrel of the hydrocarbon fraction. If desired, the clay treatment may precede the fractionation in fractionating column 61 in which case the fractionation in 61 serves to rerun the clay treated stock and to fractionate the high boiling aromatic hydrocarbons from the toluene. In place of clay treatment, the aromatic fraction may be cooled and then treated with 1 to 10 pounds of sulfuric acid per barrel of the hydrocarbons followed by neutralization with clay or caustic alkali. The acid treatment serves to remove small traces of undesirable unsaturated hydrocarbons which may be detrimental in color stability and nitration of the toluene.

The mixture of methyl ethyl ketone, water and non-aromatic hydrocarbons passed into line 34 is passed into the bottom of a washer 81 which is provided with packing material, such as broken tile 82, where the mixture is countercurrently washed with water introduced into the top of the washer via line 83. The washing procedure dissolves the methyl ethyl ketone and water from the non-aromatic hydrocarbons. The washing procedure is preferably carried out at an elevated temperature of approximately 300° F. under superatmospheric pressure, particularly in those cases where the azeotrope former is difficultly soluble in water, such as methyl ethyl ketone. The solution of water and methyl ethyl ketone is withdrawn via line 84 controlled by valve 85 and is pumped by pump 86 through line 87 into collecting tank 45.

The non-aromatic hydrocarbons are withdrawn from the top of the washer 81 via line 88 controlled by valve 89 and are passed via line 90 into a separator 91 where any water and methyl ethyl ketone which did not settle from the hydrocarbons in washer 81 separates and is passed via line 92 controlled by valve 93 and pump 94 through lines 95 and 87 to collecting tank 45. The non-aromatic hydrocarbons are removed from the separator via line 96 and passed into fractionating column 97 provided with heater 98 and reflux coil 99 where they are subjected to fractionation to remove the remaining portion of methyl ethyl ketone and water together with a portion of the non-aromatic hydrocarbons. These pass via line 100 controlled by valve 101, condensed in condenser 102 and pass via line 103 into collecting tank 104. This mixture is withdrawn via line 105 and is pumped by pump 106 either into line 107 controlled by valve 108 and line 109 into washer 81 where the mixture is subjected to re-washing together with the mixture passed through line 34 or preferably the mixture is passed via line 110 controlled by valve 111 into the bottom of a second washer 112 which is provided with checkerwork or broken tile 114 where the mixture is countercurrently washed at 300° F. and under superatmospheric pressure with water introduced into the top of the washer via line 115. The aqueous methyl ethyl ketone is withdrawn at the bottom of the washer via line 116 controlled by valve 117 and is returned by pump 118 and lines 95 and 87 to collecting tank 45. The non-aromatic hydrocarbons withdrawn at the top of the washer 112 may be recycled via line 119 controlled by valve 120 and line 109 to the washer 81 where the hydrocarbons may be further washed together with the mixture passing through line 34. However, since these hydrocarbons are now substantially free from methyl ethyl ketone, they are passed through valve 121, line 122, cooler 123 and line 124 to non-aromatic hydrocarbon storage tank 125. The non-aromatic hydrocarbons obtained at the bottom of the fractionating column 97 may likewise be passed to storage tank 125 via line 126 controlled by valve 127, pump 128 and lines 129 and 122, cooler 123 and line 124.

The aqueous methyl ethyl ketone in collecting tank 45 is passed via line 130, controlled by valve 131 and is pumped by pump 132 through line 133 into fractionating column 134 where the distillation is controlled to separate substantially all of the methyl ethyl ketone containing about 10% by volume of water. The distillation is aided by steam produced by passing a portion of the water at the bottom of the fractionating column via line 135 and pump 136 through line 137 controlled by valve 138 and steam boiler 139 from which the steam is passed via line 140 into the bottom of the fractionating column 134. The remaining portion of the water is passed via line 141 controlled by valve 142 into lines 115 and 83 to serve as the water for washing the hydrocarbons in washers 112 and 81, respectively. Preferably, this water is superheated sufficiently so that the washing procedure in both of the washers 81 and 112 is carried out at an elevated temperature and pressure.

The azeotrope former distilled in the fractinating column 134 is withdrawn via line 143 controlled by valve 144, condensed in condenser 145 and passed into collecting tank 146 from which it may be passed by pump 147 through line 148 controlled by valve 149 into storage tank 17. Part of the condensate may be passed via line 150 controlled by valve 151 to fractionating column 134 to serve as reflux for the fractionation. Preferably, the vaporized azeotrope former removed at the top of the fractionating column 134 is passed via line 152 controlled by valve 153 through lines 21 and 22, and valve 23 into line 16 to serve as azeotrope former for the distillation in fractionating column 24.

While the foregoing azeotrope former recovery system has been described as consisting essentially of a primary washing of the azeotropic distillate to remove a considerable portion of the azeotrope former followed by the distillation of the washed hydrocarbons to concentrate the remaining azeotrope former in a relatively small amount of the hydrocarbons and followed by a second washing of this mixture to remove the remaining portion of the azeotrope former, it is obvious that if the hydrocarbons obtained in the second washing operation still contain a substantial amount of azeotrope former, these may be again distilled to concentrate the remaining azeotrope former in a still smaller portion of hydrocarbons and this mixture may again be washed. In other words, the process may be carried out by employing a plurality of washing steps interposed with intermediate distillation steps in order to concentrate the unwashed azeotrope former in a relatively small amount of hydrocarbons. In this manner, the azeotrope former is effectively removed from the azeotropic distillate without loss of azeotrope former with employment of a relatively small amount of water.

Besides methyl ethyl ketone disclosed above, water soluble azeotrope formers which may be recovered from azeotropic distillates in accordance with my invention include fatty acids such as acetic, formic, propionic and isobutyric acids, aliphatic alcohols such as methyl, ethyl, isopropyl, normal propyl and tertiary butyl alcohols, polyhydric alcohols such as mono-, di-, tri-, tetra- and hexa-ethylene glycols and dipropylene glycol, ketones such as acetone, amines such as mono-, di- and tri-ethanolamine, 2-methyl-2-amino-1-propanol, ethylene diamine, phenolic compounds such as phenol, xylenols, resorcinol and catechol and alkyl ethers of polyglycols such as mono-ethyl ether of ethylene and diethylene glycols.

In some cases, particularly when an azeotrope former is used which is water insoluble and hence cannot be separated by water washing, the separation of the azeotrope former may be accomplished by extraction with a solvent which is adapted to selectively dissolve the azeotrope former and substantially none of the hydrocarbons at the temperature of extraction. Water insoluble azeotrope formers which may be extracted in this manner include such phenolic compounds as cresylic acid, fatty acids such as caproic, heptylic, caprylic and nonylic acids, amines such as aniline, toluidine, xylidine, orthophenylene diamine and alpha naphthol amine, higher aliphatic alcohols such as amyl, hexyl and neptyl alcohols, cyclic compounds such as cyclohexanone, cyclohexanol, furfural, nitrobenzene and benzyl alcohols, nitroparaffins such as nitromethane, nitroethane and the nitropropanes. The extraction of the azeotrope former by means of the selective solvent may also be employed in the case of the water soluble azeotrope formers.

Selective solvents adapted to separate the azeotrope former from the non-aromatic hydrocarbons include many of the compounds disclosed above as azeotrope formers. Particularly suitable selective solvents include the polyhydric alcohols, the ethanolamines, diethylene triamine and nitromethane.

As an example of my invention, 100 liters of a catalytically reformed gasoline fraction having a boiling range of 200 to 240° F. and consisting of 45% by volume of toluene, 6% by volume of olefins and the remainder paraffin and naphthene hydrocarbons was azeotropically distilled in the presence of 200 liters of a mixture consisting of 90% by volume of methyl ethyl ketone and 10% by volume of water at a temperature of about 160–170° F. and at atmospheric pressure. This resulted in producing overhead substantially all of the non-aromatic hydrocarbons and all of the azeotrope former. Upon cooling and settling the overhead mixture, two layers were formed, i. e. an upper containing 55 liters of hydrocarbons and 100 liters of methyl ethyl ketone and a lower layer consisting of 20 liters of water and 80 liters of methyl ethyl ketone. The upper layer was then washed at 300° F. and 150 lbs. per square inch with about 200 liters of water which resulted in removing all except about 2 liters of the methyl ethyl ketone in the hydrocarbons. The latter was then distilled at a temperature of about 160° F. and at atmospheric pressure which resulted in distilling overhead the 2 liters of the methyl ethyl ketone contained in the hydrocarbons together with about 0.7 liter of the hydrocarbons. These were condensed and were rewashed at 300° F. with about 4 liters of water which resulted in producing about 0.7 liter of hydrocarbons containing 0.01 liter of methyl ethyl ketone which was then rewashed in the presence of further amounts of azeotropic distillate in the first washer.

The foregoing description of my invention is not to be taken as limiting my invention but only as illustrative thereof since many variations may be made by those skilled in the art without departing from the scope of the following claims.

I claim:

1. In a process for the treatment of a complex hydrocarbon fraction to separate it into component parts of dissimilar characteristics which comprises distilling said complex hydrocarbon fraction in the presence of a sufficient amount of an azeotrope former to produce an azeotropic distillate consisting of at least one of the hydrocarbons contained in said complex hydrocarbon fraction together with said azeotrope former, thereby leaving at least one of the remaining hydrocarbons contained in said complex hydrocarbon fraction in the residue, the steps of extracting said azeotropic distillate with an agent adapted to dissolve one of said components and substantially none of the other components contained in said azeotropic distillate, separating a solution of said agent and dissolved component from the other components containing a portion of said dissolvable component, distilling said last named mixture in a separate distilling zone to distill overhead substantially all of said dissolvable component and a portion of said other components, leaving the remaining portion of said other components in the residue and extracting said distilled mixture in a separate extraction zone with a further amount of said agent to dissolve a further quantity of said dissolvable component.

2. In a process for the treatment of a complex hydrocarbon fraction to separate it into component parts of dissimilar characteristics which comprises distilling said complex hydrocarbon fraction in the presence of a sufficient amount of an azeotrope former to produce an azeotropic distillate consisting of at least one of the hydrocarbons contained in said complex hydrocarbon fraction together with said azeotrope former, thereby leaving at least one of the remaining hydrocarbons contained in said complex hydrocarbon fraction in the residue, the steps of extracting said azeotropic distillate with an agent adapted to dissolve said azeotrope former and substantially none of said hydrocarbons contained in said azeotropic distillate, separating a solution of said agent and azeotrope former from hydrocarbons containing a portion of said azeotrope former, distilling said last named mixture of hydrocarbons and azeotrope former in a separate distilling zone to remove overhead substantially all of said azeotrope former together with a portion of said hydrocarbons and extracting said distilled mixture in a separate extraction zone with a further quantity of said agent to dissolve a further amount of said azeotrope former.

3. A process according to claim 2 in which said azeotrope former is water soluble and said agent is water.

4. A process according to claim 2 in which said agent is a non-aqueous solvent.

5. A process according to claim 3 in which said azeotrope former is water insoluble and said agent is a non-aqueous solvent.

6. In a process for the treatment of a complex hydrocarbon fraction to separate it into component parts of dissimilar characteristics which comprises distilling said complex hydrocarbon fraction in the presence of a sufficient amount of an azeotrope former to produce an azeotropic distillate consisting of at least one of the hydrocarbons contained in said complex hydrocarbon fraction together with said azeotrope former, thereby leaving at least one of the remaining hydrocarbons contained in said complex hydrocarbon fraction in the residue, condensing said distilled mixture of azeotrope former and hydrocarbons and allowing said condensate to stratify into two layers, one of said layers consisting of a portion of said azeotrope former and the other of said layers consisting of said hydrocarbons containing a portion of said azeotrope former, the steps of extracting said azeotropic distillate with an agent adapted to dissolve said azeotrope former and substantially none of said hydrocarbons contained in said azeotropic distillate, separating a solution of said agent and azeotrope former from hydrocarbons containing a portion of said azeotrope former, distilling said last named mixture of hydrocarbons and azeotrope former in a separate distilling zone to remove overhead substantially all of said azeotrope former together with a portion of said hydrocarbons and extracting said distilled mixture in a separate extraction zone with a further quantity of said agent to dissolve a further amount of said azeotrope former.

7. A process according to claim 6 in which the azeotrope former comprises methyl ethyl ketone.

8. In a process for the treatment of a complex hydrocarbon fraction to separate it into component parts of dissimilar characteristics which comprises distilling said complex hydrocarbon fraction in the presence of a sufficient amount of an azeotrope former to produce an azeotropic distillate consisting of at least one of the hydrocarbons contained in said complex hydrocarbon fraction together with said azeotrope former, thereby leaving at least one of the remaining hydrocarbons contained in said complex hydrocarbon fraction in the residue, the steps of extracting said azeotropic distillate with an agent adapted to dissolve said azeotrope former and substantially none of said hydrocarbons contained in said azeotropic distillate, separating a solution of said agent and azeotrope former from hydrocarbons containing a portion of said azeotrope former, passing said extracted mixture of hydrocarbons and azeotrope former to a settling zone to separate entrained solution of azeotrope former and said agent, distilling the remaining extracted mixture in a separate distilling zone to remove overhead substantially all of the azeotrope former together with a portion of said hydrocarbons and extracting said distilled mixture in a separate extraction zone with a further quantity of said agent to dissolve a further amount of said azeotrope former.

9. In a process for the treatment of a complex hydrocarbon fraction to separate it into component parts of dissimilar characteristics which comprises distilling said complex hydrocarbon fraction in the presence of a sufficient amount of an azeotrope former to produce an azeotropic distillate consisting of at least one of the hydrocarbons contained in said complex hydrocarbon fraction together with said azeotrope former, thereby leaving at least one of the remaining hydrocarbons contained in said complex hydrocarbon fraction in the residue, the steps of extracting said azeotropic distillate with an agent adapted to dissolve said azeotrope former and substantially none of said hydrocarbons contained in said azeotropic distillate, separating a solution of said agent and azeotrope former from hydrocarbons containing a portion of said azeotrope former, distilling said last named mixture of hydrocarbons and azeotrope former to remove overhead substantially all of said azeotrope former together with a portion of said hydrocarbons and extracting said distilled mixture in a separate extraction zone with a further quantity of said agent to dissolve a further amount of said azeotrope former, collecting the solutions of agent and azeotrope former of said extractions and fractionally distilling said solutions to separate azeotrope former from said agent.

10. In a process for the treatment of a complex normally liquid hydrocarbon fraction to separate it into component parts of dissimilar characteristics which comprises distilling said complex hydrocarbon fraction in the presence of a sufficient amount of an organic azeotrope former to produce an azeotropic distillate consisting of at least one of the hydrocarbons contained in said complex hydrocarbon fraction together with said azeotrope former, thereby leaving at least one of the remaining hydrocarbons contained in said complex hydrocarbon fraction in the residue, the steps of extracting said azeotropic distillate with an organic agent in an amount adapted to dissolve one of said components and substantially none of the other components contained in said azeotropic distillate, separating a solution of said agent and dissolved component from the other components containing a portion of said dissolvable component, distilling said last named mixture in a separate distilling zone to distill overhead substantially all of said dissolvable component and a portion of said other components, leaving the remaining portion of said other components in the residue, and extracting said distilled mixture in a separate extraction zone with a further amount of said agent to dissolve a further quantity of said dissolvable component.

CLYDE H. O. BERG.

REFERENCES CITED

The following references are of record in the file of this patent:

UNITED STATES PATENTS

| Number | Name | Date |
|---|---|---|
| 2,050,513 | Van Peski et al. | Aug. 11, 1936 |
| 2,265,220 | Sullivan, Jr. | Dec. 9, 1941 |
| 2,279,194 | Field | Apr. 7, 1942 |
| 2,113,965 | Roelfsema | Apr. 12, 1938 |
| 2,290,636 | Deansely | July 21, 1942 |
| 2,069,329 | Roelfsema | Feb. 2, 1937 |
| 2,294,696 | Schmitkons | Sept. 1, 1942 |
| 2,186,524 | Frey | Jan. 9, 1940 |
| 2,316,860 | Guinot | Apr. 20, 1943 |

OTHER REFERENCES

Perry's Chemical Engineers Handbook, 1st edition McGraw-Hill Co., 1934, page 565. (Copy in Library of Congress.)